United States Patent [19]
Gorbet et al.

[11] Patent Number: 5,781,190
[45] Date of Patent: Jul. 14, 1998

[54] METHOD AND SYSTEM FOR TRANSFERRING A SLIDE PRESENTATION BETWEEN COMPUTERS

[75] Inventors: David P. H. Gorbet, San Francisco; Rosanna H. Ho, Foster City; Imran I. Qureshi, Mountain View, all of Calif.

[73] Assignee: Microsoft Corporation, Redmond, Wash.

[21] Appl. No.: 655,228

[22] Filed: Jun. 5, 1996

[51] Int. Cl.⁶ .................................................. G06F 3/00
[52] U.S. Cl. ................................ 345/335; 395/200.3
[58] Field of Search ............................... 395/329, 330, 395/335, 200.3, 200.33, 200.34, 200.42, 200.47, 200.57; 345/329, 330, 331, 335; 707/501

[56] References Cited

U.S. PATENT DOCUMENTS 5,412,772  5/1995  Monson ............................ 345/335

OTHER PUBLICATIONS

Brockschmidt, *Inside OLE*, Microsoft Press (2d ed. 1995), pp. 635–729, 947–1009.

*Primary Examiner*—A. Katbab
*Attorney, Agent, or Firm*—Seed and Berry LLP

[57] ABSTRACT

A presentation transport system is provided that transfers a slide presentation from a source computer to a destination computer in such a manner as to ensure that the presentation will look and operate in the manner in which it was intended on the destination computer. In order to provide this functionality, the presentation transport system packs up the presentation on the source computer, including the link sources for the presentation, stores the presentation and the link sources onto a transfer medium, and unpacks the presentation and the link sources after it has been transferred to the destination computer. During this process, the links contained in the presentation are maintained so that when the presentation is displayed on the destination computer, the links are operational. Additionally, the fonts used by the presentation are transferred by the presentation transport system so as to ensure that when the presentation is displayed, the correct fonts are used. Further, the presentation transport system allows the user to package a viewer with the presentation so as to ensure that there is a means for displaying the presentation after it has been transferred to the destination computer.

47 Claims, 16 Drawing Sheets

METHOD AND SYSTEM FOR TRANSFERRING A SLIDE PRESENTATION BETWEEN COMPUTERS

TECHNICAL FIELD

The present invention relates generally to data processing systems, and more particularly, to transferring a slide presentation between computers.

BACKGROUND OF THE INVENTION

Presentation programs have been developed to aid a user in developing a slide presentation. Each slide presentation contains a number of slides that display information, such as text, to an audience. Also, each slide presentation can contain a link to data (linked data) stored in an external source, such as a spreadsheet. The external source is referred to as a link source.

A link contains both a representation of the linked data and a reference to the linked data. The representation contains a static snapshot of the linked data, and as such, the representation must be updated periodically to reflect changes made to the linked data. An update is performed by accessing the linked data via the reference to retrieve the latest version of the linked data. The representation is a pictorial representation, like a bitmap that describes a screen graphic, of how the linked data appeared on the computer display as of the last time the representation was updated. For example, when the linked data is a range of spreadsheet cells, the representation of the linked data would be the actual graphical depiction of the range of spreadsheet cells as it appears on the computer display. An example of a reference to linked data is a file name with a path and an indication of the specific linked data within the file. For example, the reference "C:\spreadsheets\financial.xls!A1:F1" indicates that the linked data comprises the cells "A1:F1" in the spreadsheet with the file name "financial.xls" at path "C:\spreadsheets." When the representation is displayed, the representation is displayed to the audience as an integrated part of the presentation.

As previously stated, the representation of the linked data can be updated. Specifically, when the linked data contained in the link source is modified, the representation within the presentation can be updated to reflect the modifications in either a manual manner or an automatic manner. Manually updating the representation occurs when a user issues a command; in response to which, the presentation program accesses the linked data within the spreadsheet via the reference and updates the representation stored in the presentation. Automatically updating a link refers to when the presentation program, upon every invocation, automatically accesses the linked data in the spreadsheet program via the reference and updates the representation of the linked data in the presentation.

In addition to facilitating the update of the representation, a link provides additional useful functionality. When displaying a presentation, a user can double-click on the link and the application program (e.g., a spreadsheet program) that manages the link source (e.g., the spreadsheet) is launched. When the application program is launched, the user can then edit the linked data contained in the link source. Additionally, the user can display the entire link source to the audience so as to either answer questions regarding the origin of the linked data or provide the audience with more of a complete understanding of the linked data.

The links within a slide presentation are transparent to a user. That is, the links are not easily distinguishable from the other information contained in the slide presentation. As such, many users do not understand that the linked data is not stored in the slide presentation, but is actually stored in a separate file. This transparency, intended for ease of use, sometimes leads to the slide presentation being unusable in its original form after the presentation has been transferred from one computer (source computer) to another computer (destination computer). For example, it is common for a user to develop a slide presentation on one computer at their office and then display the presentation to an audience using another computer at a different location. Frequently, the slide presentation contains links to data contained within a database, a spreadsheet program, a word processing document, or other such link source. However, when the user stores the presentation on a disk, due to the transparency of the links, the user often does not remember or even know to transfer the link sources with the presentation. In this situation, when the user transports the presentation from the source computer and attempts to display the presentation on a destination computer, the links are inoperable since the link sources are not contained on the destination computer. That is, the representation as last updated is fixed and cannot be updated, which prevents the user from either editing the linked data or displaying the entire link source. The inoperability of the links poses a problem when the user realizes that the data is incorrect and there is no way to update the representation. It is thus desirable to facilitate the transportation of a slide presentation from a source computer to a destination computer so as to ensure that after transportation, the links in the slide presentation remain operational.

SUMMARY OF THE INVENTION

A presentation transport system is provided that packs up a slide presentation containing links on a source computer in such a manner as to ensure that the links will be operational after being transported to a destination computer. Additionally, the presentation transport system performs other functionality that ensures that the presentation will look and operate in the manner in which it was intended after being transferred to the destination computer. In order to provide this functionality, the presentation transport system packs up a presentation on a source computer, including the link sources for the presentation, stores the presentation and the link sources on a transfer medium, and unpacks the presentation and the link sources after it has been transferred to a destination computer.

During the packing process, the presentation transport system performs functionality that ensures that the presentation will look and operate in the manner in which it was intended after being transferred to the destination computer. For example, when the user selects a presentation for transfer, the presentation transport system displays the first slide of the presentation so that the user can determine whether they are packing the correct presentation. Also, the presentation transport system identifies links within the presentation, collects the link sources, and updates the links to refer to the collected link sources, which ensures that the links will be operational on the destination computer. Additionally, the presentation transport system provides the user with the ability to embed fonts within the presentation so as to ensure that the correct fonts are transferred to and used by the destination computer. That is, there is no guarantee that the destination computer has the fonts used by the presentation. In the case where a presentation is displayed by a computer that does not have the correct fonts, alternative fonts are used which may substantially alter the appearance of the presentation. Further, the presentation transport system provides the user with the ability to package a viewer with the presentation so as to ensure that there is a means for displaying the presentation on the destination computer. Otherwise, it is possible that the user may transport the presentation to the destination computer only to find that the destination computer does not have the presentation program installed, and hence, there is no means for displaying the presentation. The viewer is a stripped-down version of the presentation program that contains sufficient functionality to display the presentation, but typically has insufficient functionality to edit and create a presentation.

The presentation transport system provides the user with flexibility when storing the presentation onto the transfer medium. In particular, the user can choose to transfer the presentation via a network or a secondary storage device. When utilizing a secondary storage device, the user may choose to store the presentation on a secondary storage device that is typically not removable, such as an internal hard disk, or the user may choose to store the presentation on a secondary storage device that is typically removable, such as an external hard disk or a floppy disk. In the case of a floppy disk, the presentation transport system can store the presentation and all of the accompanying files across multiple floppy disks so as not to be limited by the capacity of a single floppy disk. Further, the presentation transport system can compress the presentation and all of the accompanying files to save space on the transfer medium.

In order to facilitate the unpacking process, the presentation transport system provides a setup program. The setup program is invoked on the destination computer by a user, and after invocation, the setup program performs all of the steps necessary to render the presentation operational. For example, the setup program decompresses all of the files, installs the viewer, and automatically launches the viewer into the slide presentation if the user so desires. By providing a setup program, the presentation transport system facilitates the distribution of a presentation to another user. That is, the other user needs to know virtually nothing about the presentation; all they need to know is to invoke the setup program, which will perform all installation and setup necessary so that the user can immediately view the presentation. Based upon the finctionality performed when packing a presentation, storing the presentation on the transfer medium, and unpacking the presentation, the presentation transport system facilitates the transfer of a slide presentation from a source computer to a destination computer so as to ensure that the slide presentation looks and operates in the manner in which it was intended after being transferred to the destination computer.

In accordance with a first aspect of the present invention, a method is performed in a data processing system for transferring a file from a source computer to a destination computer. The method accesses the file in the source computer where the file contains a link to linked data contained in an external source. The link is used for accessing the linked data. The method stores the file and the external source onto a transfer medium, and the method transfers the file with the external source to the destination computer such that the link to the linked data is operational so that when the first file is displayed, the linked data is accessible via the link.

In accordance with a second aspect of the present invention a data processing system is provided. The data processing system comprises a transfer medium, a source computer and a destination computer. The transfer medium transfers data from the source computer to the destination computer. The source computer has a component for accessing a presentation containing a link to linked data contained in an external source such that the linked data is accessed via the link and for storing the presentation with the external source onto the transfer medium. The destination computer has a component for receiving the presentation and the external source and for maintaining the link to the linked data such that the linked data is accessible via the link.

DETAILED DESCRIPTION OF THE INVENTION

Figure 1A:
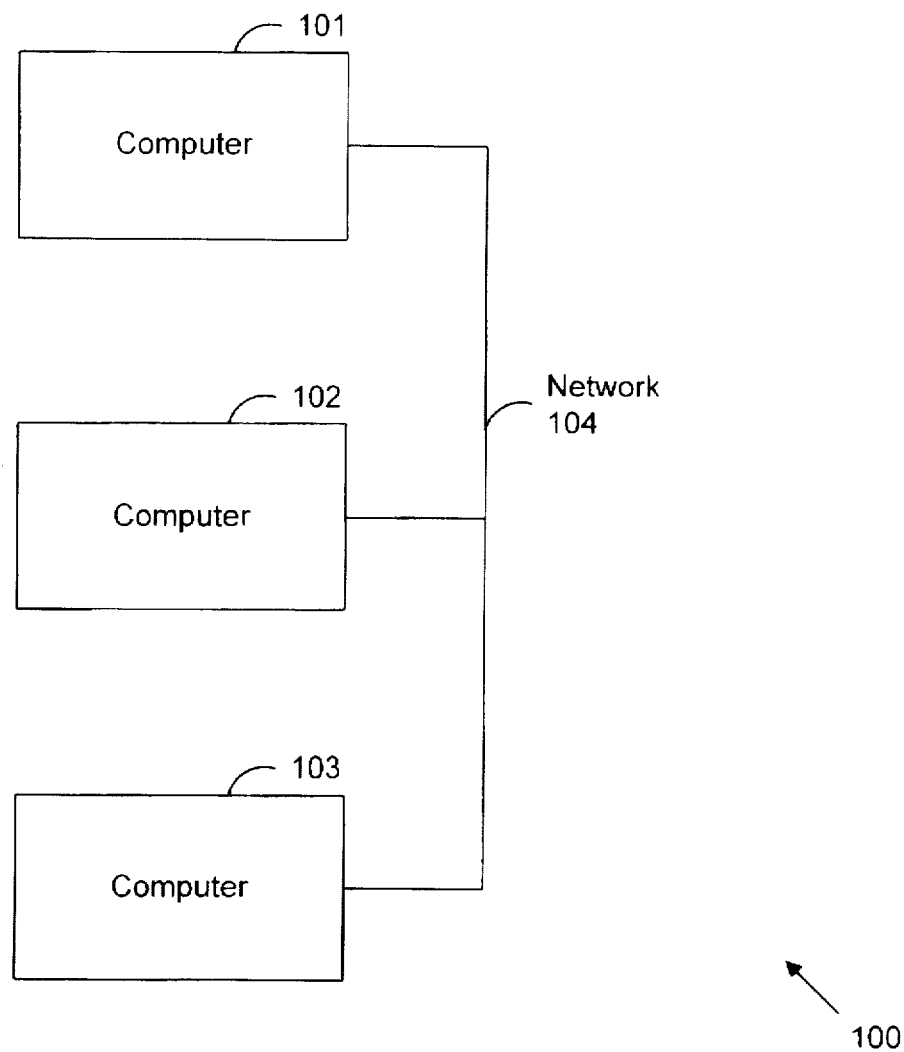
FIG. 1A depicts a data processing system suitable for practicing a referred embodiment of the present invention.

A preferred embodiment of the present invention provides a presentation transport system that packs up a slide presentation containing links on a source computer in such a manner as to ensure that the links will be operational after being transferred to a destination computer. Additionally, the presentation transport system performs other functionality that ensures that the presentation will look and operate in the manner in which it was intended after being transferred to the destination computer. To provide this functionality, the presentation transport system packs up a presentation on a source computer, including the link sources for the presentation, stores the presentation and the link sources on a transfer medium, and unpacks the presentation and the link sources after it has been transferred to a destination computer.

During the packing process, the presentation transport system performs functionality that ensures that the presentation will look and operate in the manner in which it was intended after being transferred to the destination computer. For example, when the user selects a presentation for transfer, the presentation transport system displays the first slide of the presentation so that the user can determine whether they re packing the correct presentation. Also, the presentation transport system identifies links within the presentation, collects the link sources, and updates the links to refer to the collected link sources, which ensures that the links will be operational on the destination computer. Additionally, the presentation transport system provides the user with the ability to embed fonts within the presentation so as to ensure that the correct fonts are transferred to and used by the destination computer. That is, there is no guarantee that the destination computer has the fonts used by the presentation. In the case where a presentation is displayed by a computer that does not have the correct fonts, alternative fonts are used which may substantially alter the appearance of the presentation. Further, the presentation transport system provides the user with the ability to package a viewer with the presentation so as to ensure that there is a means for displaying the presentation on the destination computer. Otherwise, it is possible that the user may transport the presentation to the destination computer only to find that the destination computer does not have the presentation program installed, and hence, there is no means for displaying the presentation. The viewer is a version of the presentation program that contains sufficient finctionality to display the presentation, but typically has insufficient functionality to edit and create a presentation.

The presentation transport system provides the user with flexibility when storing the presentation onto the transfer medium. In particular, the user can choose to transfer the presentation via a network or a secondary storage device. When utilizing a secondary storage device, the user may choose to store the presentation on a secondary storage device that is typically not removable, such as an internal hard disk, or the user may choose to store the presentation on a secondary storage device that is typically removable, such as an external hard disk or a floppy disk. In the case of a removable storage device such as a floppy disk, the presentation transport system can store the presentation and all of the accompanying files across multiple floppy disks so as not to be limited by the capacity of a single floppy disk. Further, the presentation transport system can compress the presentation and all of the accompanying files to save space on the transfer medium.

To facilitate the unpacking process, the presentation transport system provides a setup program. The setup program is invoked on the destination computer by a user, and after invocation, the setup program performs all of the steps necessary to render the presentation operational. For example, the setup program decompresses all of the files, installs the viewer, and automatically launches the viewer into the slide presentation if the user so desires. By providing a setup program, the presentation transport system facilitates the distribution of a presentation to another user. That is, the other user needs to know virtually nothing about the presentation; all they need to know is to invoke the setup program, which will perform all installation and setup necessary so that the user can immediately view the presentation. Based upon the functionality performed when packing a presentation, storing the presentation on the transfer medium, and unpacking the presentation, the presentation transport system facilitates the transfer of a slide presentation from a source computer to a destination computer so as to ensure that the slide presentation looks and operates in the manner in which it was intended after being transferred to the destination computer.

FIG. 1A depicts a data processing system 100 that is suitable for practicing a preferred embodiment of the present invention. The data processing system 100 contains computer 101, computer 102, and computer 103 connected via a network 104, such as a local area network, a wide area network or an interconnection of many networks like the Internet. Computer 101 acts as the source computer when transferring a presentation, and computer 102 acts as the destination computer during the transfer. Although only three computers are depicted, one skilled in the art will appreciate that the present invention can be practiced in a data processing system having many more computers.

Figure 1B:
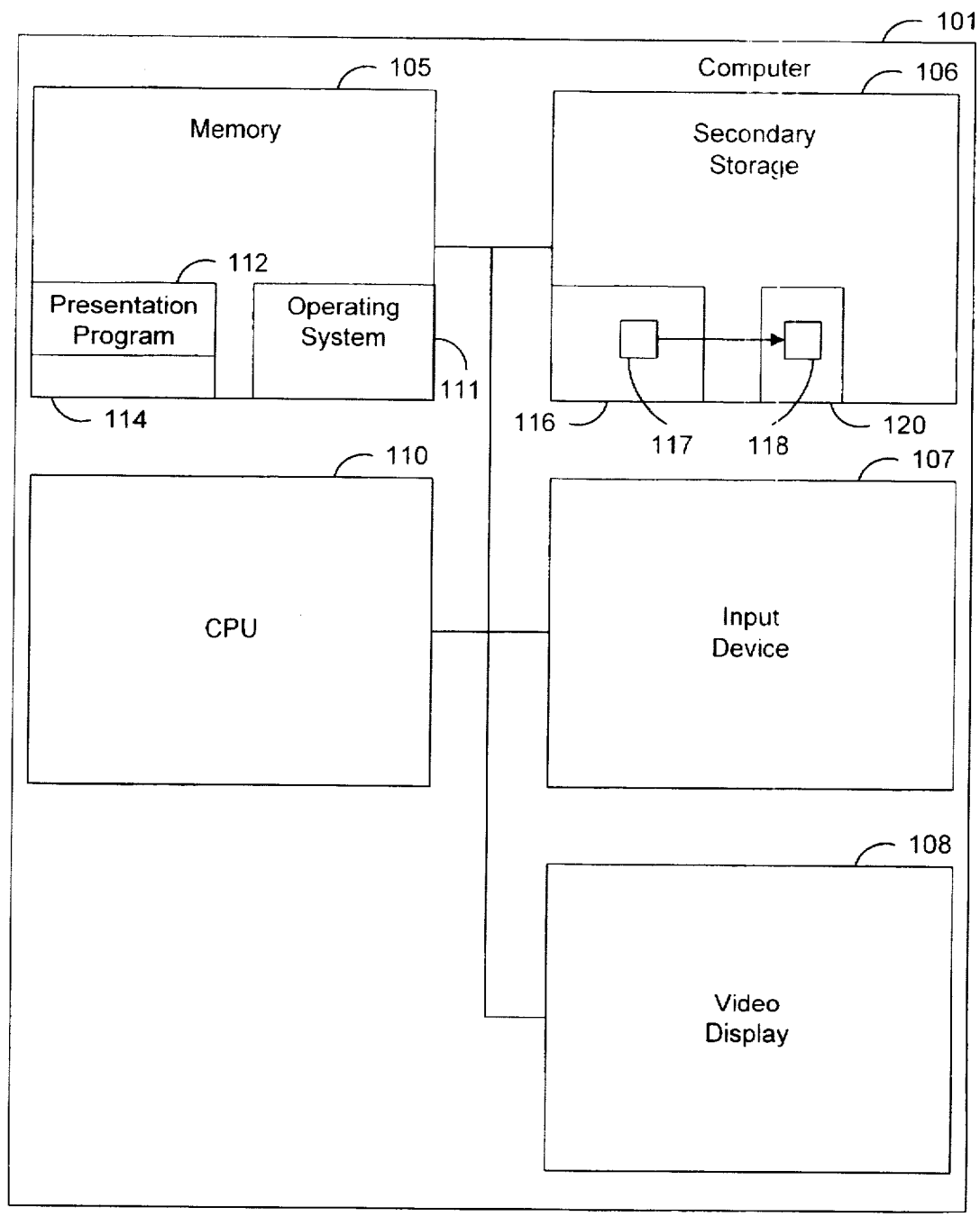
FIG. 1B depicts in more detail computer 101 of FIG. 1A in which is stored the presentation transport system of a preferred embodiment of the present invention.

FIG. 1B depicts computer 101 of FIG. 1A in more detail. Computer 101 contains a memory 105; a secondary storage device 106, such as a hard disk drive or a floppy disk drive; an input device 107; a computer display 108; and a central processing unit (CPU) 110. The memory 105 contains an operating system 111 and a presentation program 112 that implements the presentation transport system 114 of a preferred embodiment. In a preferred embodiment, the operating system 111 is the Microsoft Windows 95 operating system, and the presentation program 112 is the PowerPoint presentation program, which are both sold by Microsoft Corporation of Redmond, Washington. Additionally, in a preferred embodiment, the presentation transport system 114 is the Pack and Go Wizard of the PowerPoint presentation program. The secondary storage device 106 contains a presentation 116 with a link 117 referring to linked data 118 in a link source 120. One skilled in the art will appreciate that the link source 120 can be a database, a spreadsheet, a word processing document, a text file, or a graphics file containing graphics objects. One skilled in the art will also realize that the linked data 118 can be a video clip or a sound clip. Further, one skilled in the art will appreciate that the link source 120 can be located on a computer, such as computer 103, that is separate from computer 101, but which is linked via a network. Although a preferred embodiment is described as being implemented on the Windows 95 operating system, one skilled in the art will appreciate that the presentation can be used on other operating systems, such as the Windows NT operating system. Also, one skilled in the art will recognize that, although only the components of computer 101 have been described, computers 102 and 103 may contain similar components.

The presentation transport system 114 is preferably implemented as a visual basic application. A visual basic application is used to provide additional functionality to an application program in an easy and efficient manner. Such additional functionality includes custom commands, menus, dialog boxes and messages. A visual basic application is developed on a macro language interpreter that receives computer code in the well-known visual basic programming language. When the application program is run, code is interpreted at run time by the interpreter to provide the additional functionality to the application program. Although the presentation transport system of a preferred embodiment is implemented as a visual basic application, one skilled in the art will appreciate that the presentation transport system could be implemented as in-line code, a function, a module, a dynamically linked library, or some other software entity.

The presentation program of a preferred embodiment utilizes the well-known Microsoft OLE compound document architecture specified in Brockschmidt, *Inside OLE* (2d ed.), Microsoft Press, 1995. The links contained within a presentation of a preferred embodiment are link objects as discussed in Brockschmidt at pp. 947–1009. The presentation program of a preferred embodiment is an OLE automation server and the presentation transport system of a preferred embodiment accesses this server. An OLE automation server is a program that provides a programmatic interface to the majority of its functionality. That is, a client, through OLE automation, can programmatically invoke the majority of the functionality of the program. The programmatic interface and, more generally, how to implement an OLE automation server is described in Brockschmidt, at pp. 635–729.

In acting as an OLE automation server, the presentation program provides an object model, a hierarchy of objects and collections of objects, through which the functionality of the presentation program can be invoked. Visual basic applications run within the address space of the program to which they are associated, and as such, visual basic applications have direct access to the objects and collections of the object model. The objects of the object model represent a specific element of the presentation program (e.g., a particular presentation) and contain both function members (i.e., methods), which perform behavior, and data members, which contain information regarding the object. Collections are groupings of objects. For example, if the object model represented the functionality of a spreadsheet program, the object model may provide a collection of "spreadsheet" objects, where each object has a "calculate" function member to perform calculations and a "cellcount" data member that contains the total number of cells in the spreadsheet. Since visual basic applications have direct access to the objects and collections of the object model, a visual basic application can invoke the calculate function member. Similarly, the visual basic application can access the cellcount data member. Another example of an object with function members and data members is that of a window object which may contain function members, such as open, close, maximize, and minimize. These function members would, respectively, open the window, close the window, maximize the representation of the window, and minimize the representation of the window into an iconic format. The window object may contain certain data members, such as location and shading. The location data member may specify in Cartesian coordinates the location of the window on the computer display, and the shading data member may indicate a type of shading being used in the window, such as gray shading.

Figure 2:
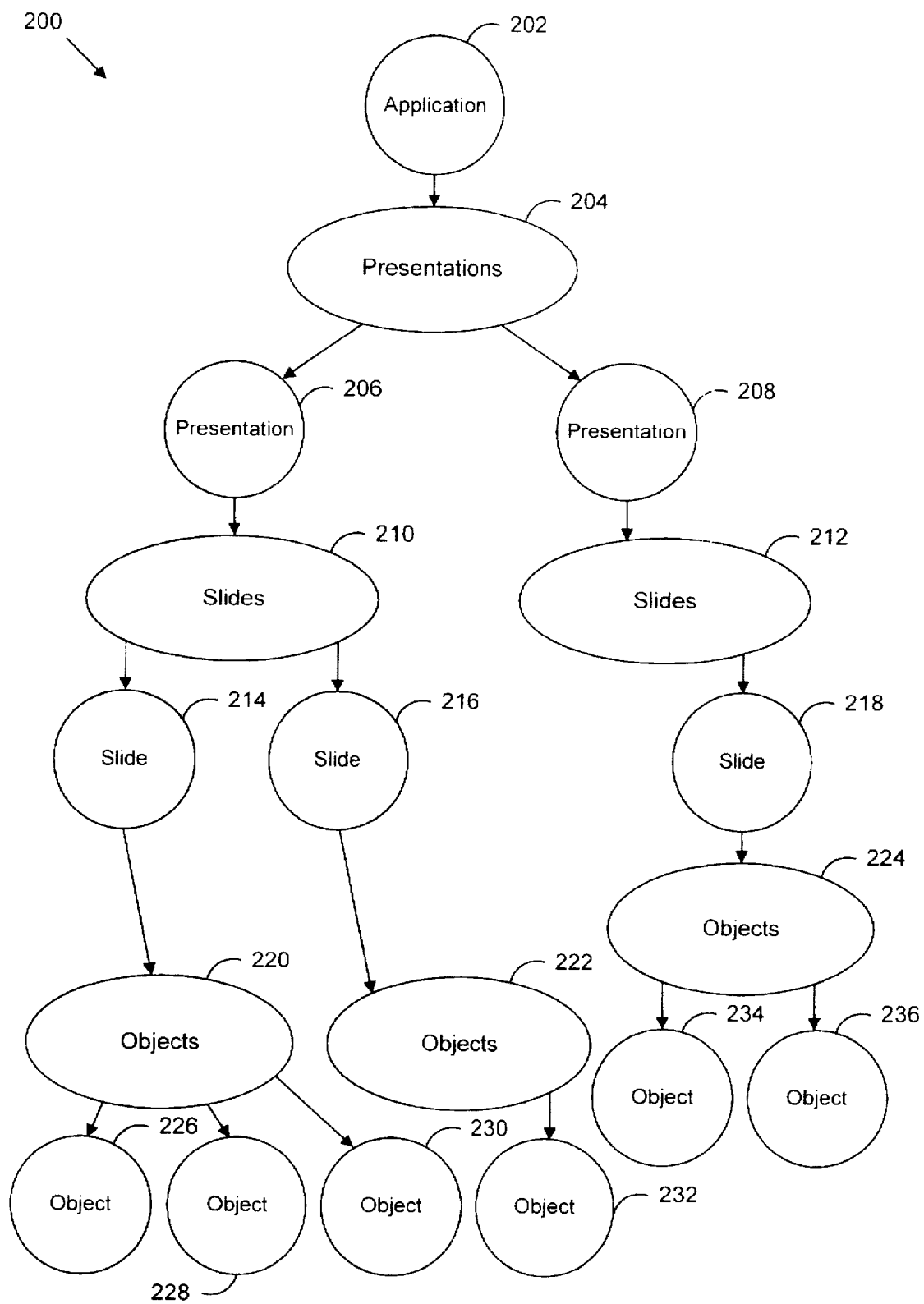
FIG. 2 depicts an object model as used by the presentation program depicted in FIG. 1.

FIG. 2 depicts the object model 200 of the presentation program 112 of a preferred embodiment. The object model 200 has an application object 202 that acts as the root of the object model hierarchy through which all objects and collections can be accessed. As previously described, an object within the object model 200 contains both function members and data members. The function members provide behavior and the data members provide information about the object. In addition to objects, the object model 200 contains collections. A "collection" is a grouping of objects of a particular type. For example, in the object model 200, there is a presentations collection 204 that groups a number of presentation objects 206, 208, each presentation object representing a presentation that is maintained by the presentation program. The presentations collection 204, through a visual basic application, is directly accessible as an array with each element of the array being a particular presentation object.

As shown in FIG. 2, the presentations collection 204 can be accessed from the application object 202. The presentations collection 204 is a collection of presentation objects 206, 208. The presentations collection 204 contains function members and data members relevant to all of the presentations. For example, the add function member of the presentations collection 204 creates a presentation, as represented by a presentation object, and adds it to the collection. The count data member of the presentations collection 204 contains the number of presentations known to the presentation program. Each presentation object 206 and 208 represents a particular presentation. The presentation objects 206, 208 contain function members that act upon a particular presentation and data members that provide information regarding a particular presentation. For example, the save function member of the presentation object saves a particular presentation and the graphic format data member contains the default background for a slide of the presentation.

The slides collections 210, 212 can be accessed from each presentation object 206, 208. The slides collections 210, 212 contain function members and data members that are relevant to all of the slides for a given presentation. For example, the add function member of a slides collection adds a slide to the presentation, and the count data member of the slides collection contains a total number of all the slides within the presentation. Each slide object 214, 216, 218 contains function members and data members relevant to a particular slide. For example, the slide objects 214, 216, 218 contain the duplicate function member, which returns a duplicate copy of the slide, and contain the layout data member, which indicates whether a slide is to display both a title and a subtitle or only the title. The objects collections 220, 222, and 224 can be accessed from the slide objects 214, 216, 218. The objects collections 220, 222, 224 are groupings of all of the components that can be inserted into a slide. These insertable components are represented by objects 226, 228, 230, 232, 234 and 236 of the object model 200. The insertable components include, but are not limited to, the following: drawings, shapes, pictures, text objects, titles, headers, footers, slide numbers and links. Each object 226, 228, 230, 232, 234, 236 contains function members and data members relevant to a particular insertable component, such as the type data member, which indicates the type of component inserted into the slide.

Figure 3A:
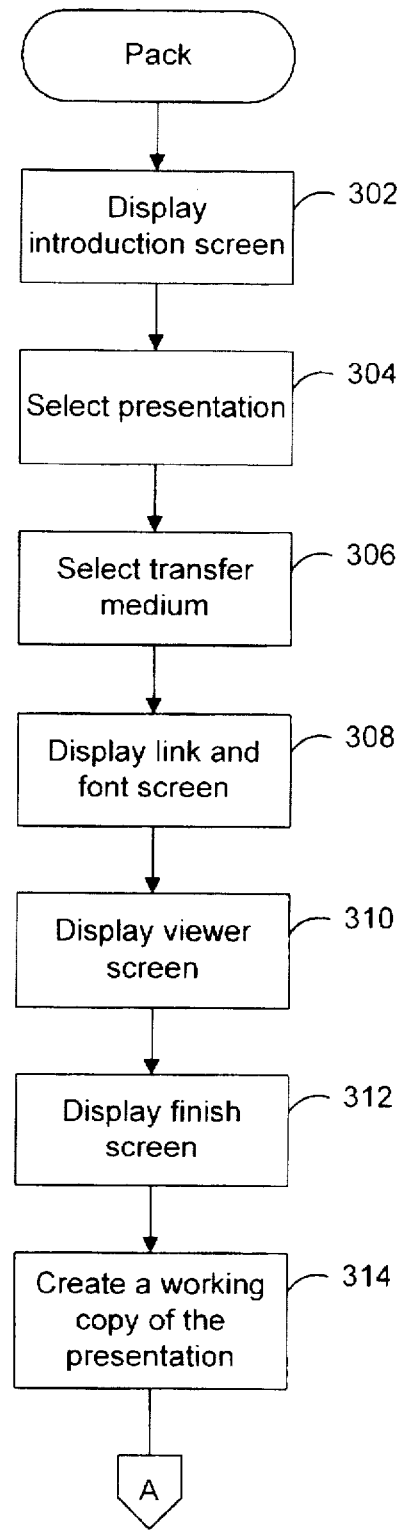
FIGS. 3A through 3C depict a flowchart of the steps performed by the presentation transport system of FIG. 1 during the packing process.
Figure 3B:
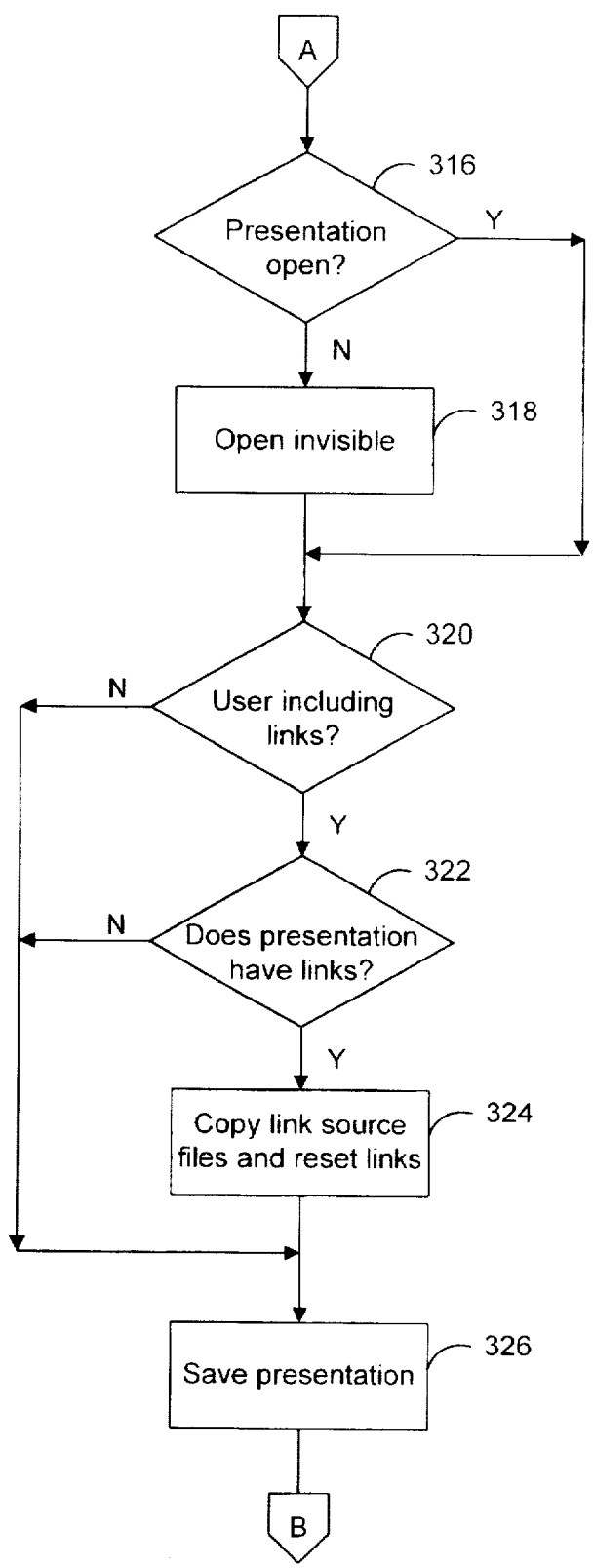
Figure 3C:
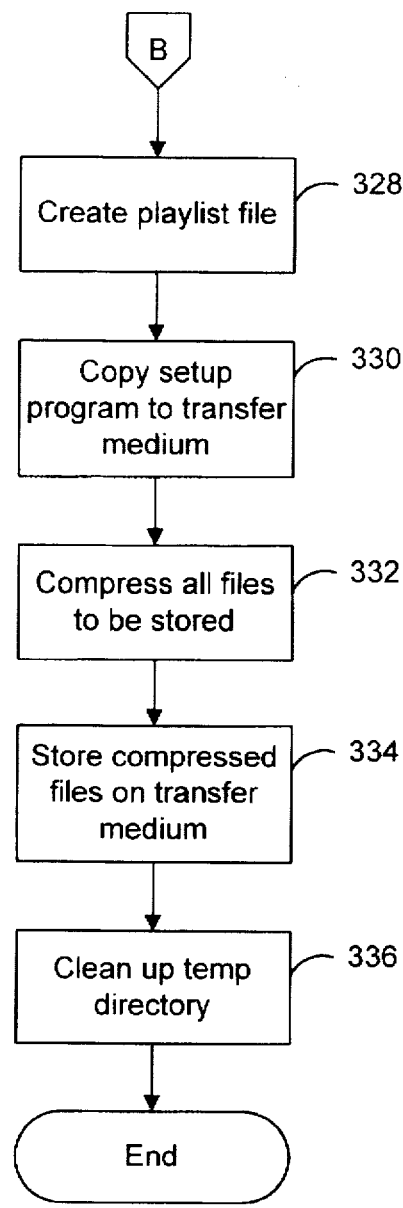
Figure 4A:
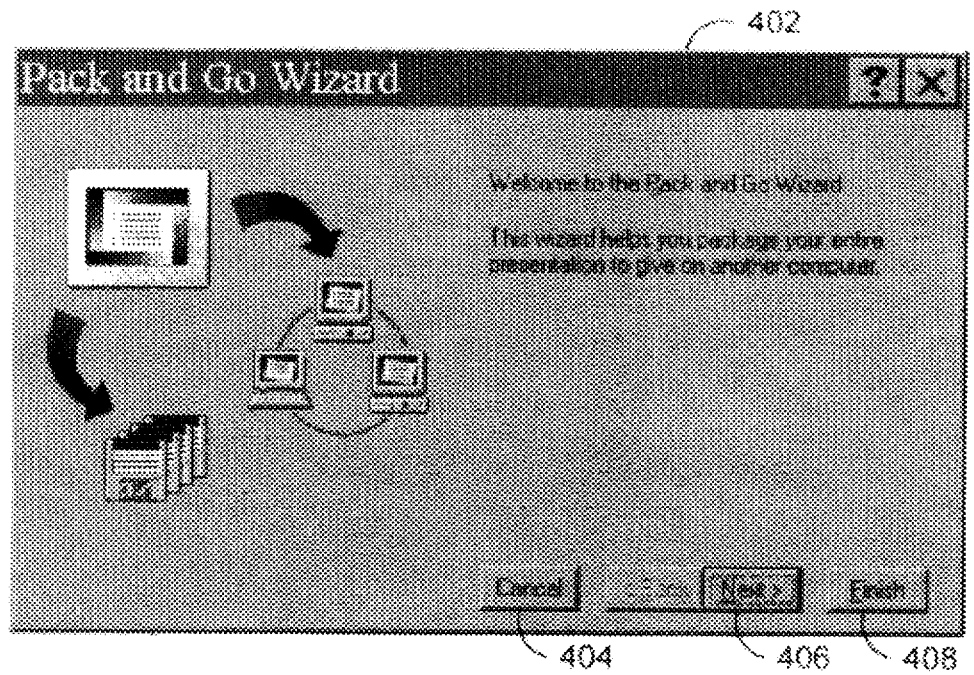
FIGS. 4A through 4H depict the screens displayed to a user by the presentation transport system of FIG. 1 during the packing process.
Figure 4B:
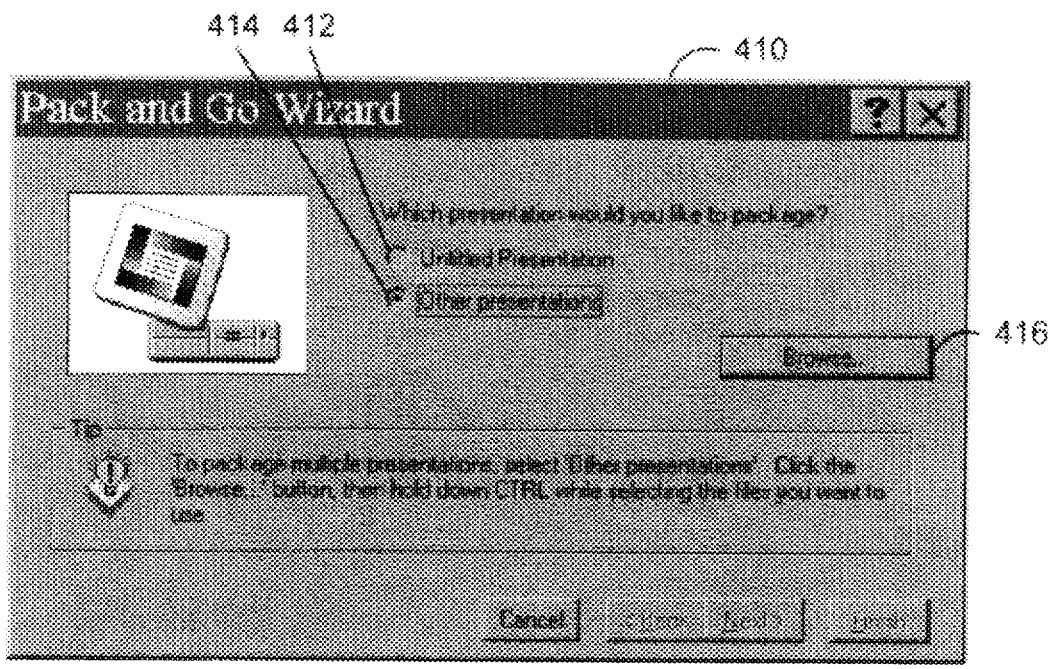
Figure 4C:
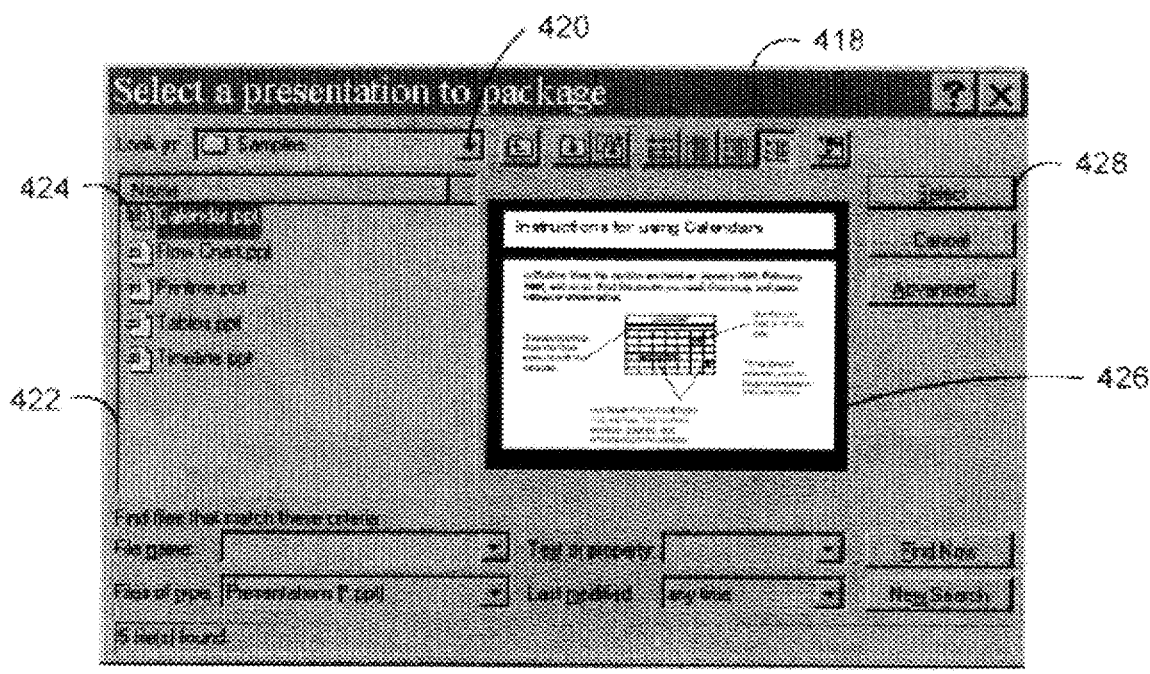
Figure 4D:
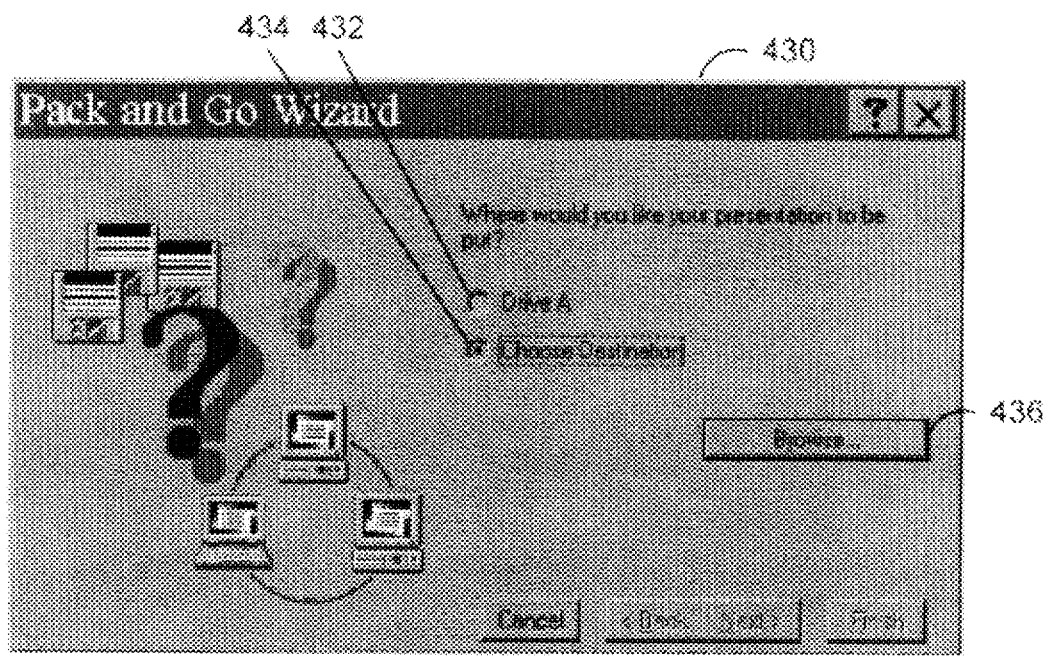

FIGS. 3A–3C depict a flowchart of the steps performed by the presentation transport system during the packing process. The first step performed during the packing process is to display the introduction screen 402 to the user as shown in FIG. 4A (step 302). The introduction screen 402 allows a user to cancel the packing process by pressing the cancel button 404, continue the packing process by pressing the next button 406, or finish the packing process by pressing the finish button 408. If the finish button 408 is depressed, the presentation transport system will assume various default settings and immediately display the finished screen, which is discussed relative to step 312 below. For the purpose of clarity, only the normal sequence through the screens of FIGS. 4A–4H will be described below, although it should be apparent that the user can press the cancel button or the finish button on any of the screens. Assuming the user wishes to continue the packing process, the user selects one or more presentations to be packaged (step 304). In this step, screen 410, depicted in FIG. 4B, is displayed to the user so the user can select a presentation. The screen 410 allows the user to select the presentation that is currently active in the presentation program. As shown in FIG. 4B, the presentation that is currently active is the "untitled" presentation 412. Additionally, the screen 410 allows the user to look for presentations in other directories on the local computer or on a remote computer via the network by selecting other presentations 414 and by pressing the browse button 416. Upon selecting the browse button 416, screen 418 of FIG. 4C is displayed to the user. When this screen is displayed, the user may browse through directories or storage devices that are either local or remote to computer 101 by using the list box 420. Each time a directory is encountered containing slide presentations, the slide presentations are displayed in display area 422. Upon selecting one of the presentations 424 within the display area 422, the presentation program automatically displays the first slide of the presentation in display area 426 so that the user may determine whether the presentation is the one that they intended. Upon depressing the select button 428, all presentations within the display area 422 that are currently selected are designated for transfer.

Figure 4E:
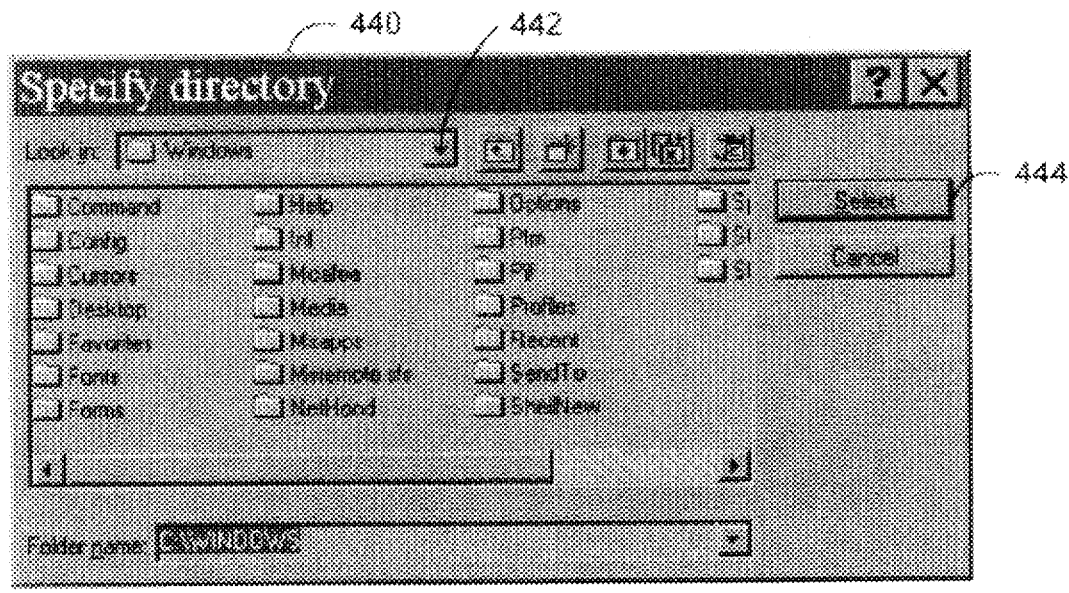

After the user has selected one or more presentations, the user selects a transfer medium (step 306). In this step, the presentation transport system displays screen 430 of FIG. 4D, which allows the user to choose the intermediate location where the presentation should be copied to for transportation to the destination computer. In screen 430, the presentation transport system allows the user to select one of the removable storage devices 432 of the computer or allows the user to select another location 434 that is either on a local hard disk or on a remote secondary storage device. That is, the presentation transport system displays up to two removable storage devices 432 to the user. Upon determining to choose a destination 434 other than the floppy disk drive 432, the user selects the browse button 436. After selecting the browse button 436, screen 440 of FIG. 4E is displayed to the user where the user can select a location on a storage device that is either local or remote by using list box 442 and then depressing the select button 444.

Figure 4F:
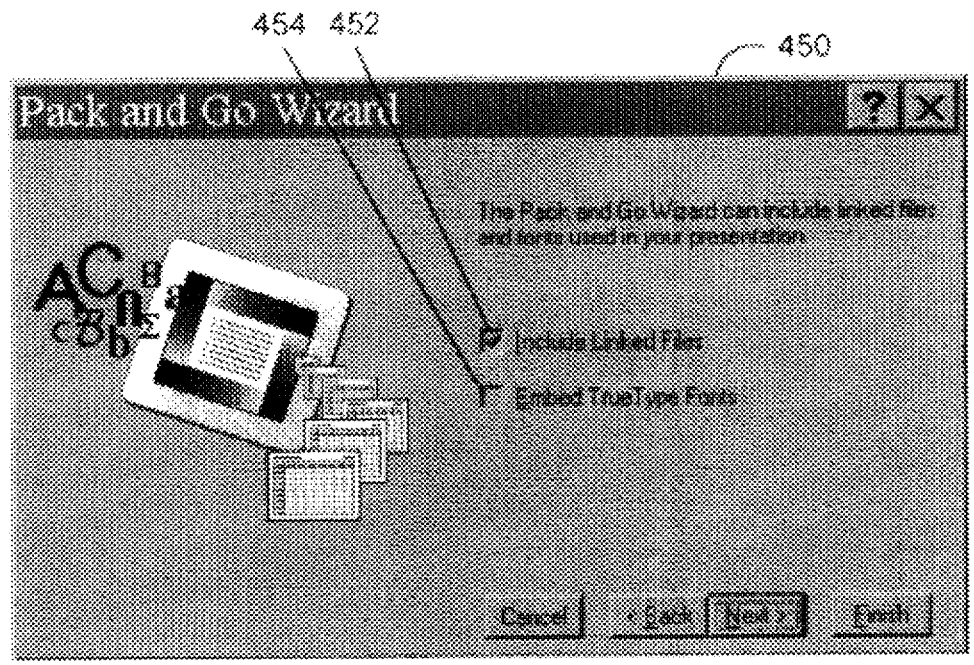
Figure 4G:
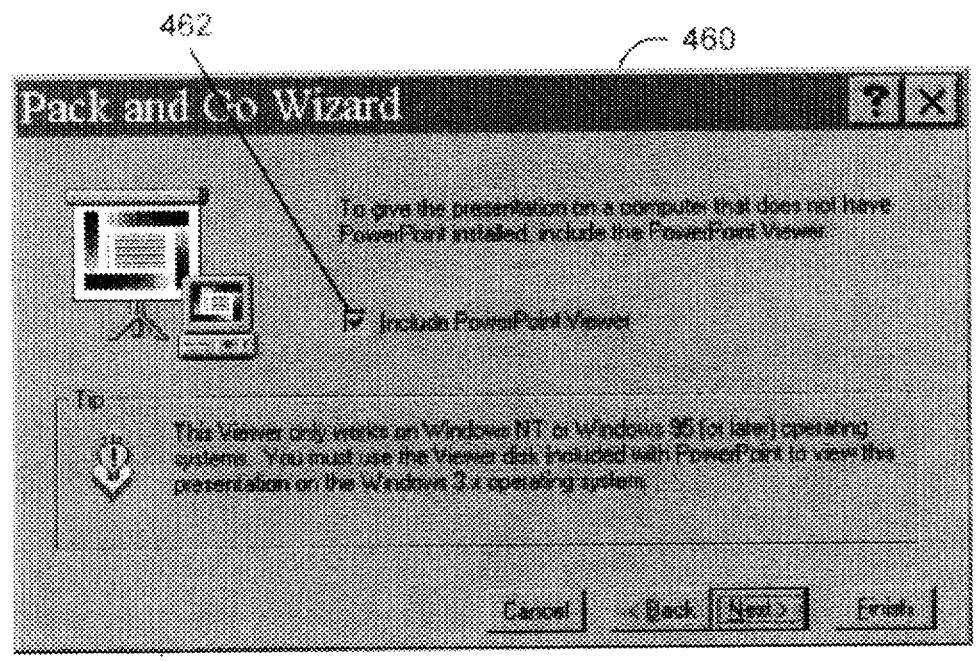
Figure 4H:
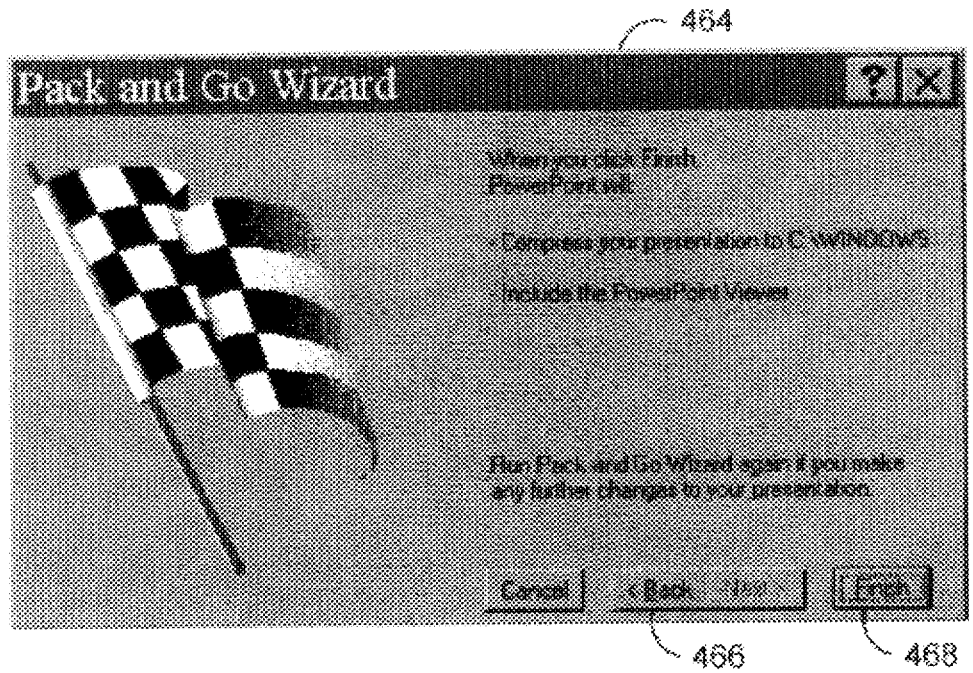

After selecting the transfer medium, the presentation transport system displays the link and font screen 450 of FIG. 4F to the user, which allows the user to include linked files (i.e., link sources), by using check box 452, and fonts, by using check box 454, with the selected presentation (step 308). Upon choosing either, neither, or both of these choices, the viewer screen 460 of FIG. 4G is displayed to the user where the user may then choose, by using check box 462, to include the viewer with the presentation to be transferred to the destination computer (step 310). After indicating whether or not to include the viewer, the presentation transport system displays the finished screen 464 depicted in FIG. 4H (step 312). Upon being presented with the finished screen 464, the user may choose to go back to a previous screen and change any of their settings by depressing the back button 466, or they may choose to allow the presentation transport system to complete the packing process by depressing the finish button 468. After depressing the finish button 468, the presentation transport system then completes the packing process without user interaction in steps 314–336.

After depressing the finish button 468, the presentation transport system creates a working copy of the selected presentation (or presentations) into the user's temp directory (step 314). Each user on a computer with the Windows 95 operating system has a directory known as the "temp" directory. If the presentation is currently open, the presentation transport system performs this step by saving the presentation to the user's temp directory. If the presentation is not open, the presentation transport system performs this step by copying the presentation from its current location on a storage device into the temp directory. Next, the presentation transport system determines if the presentation is currently open (step 316 in FIG. 3B). If the presentation is not open, the presentation is opened in a mode where the presentation is invisible to the user (step 318). In this step, the presentation transport system accesses the object model. In accessing the object model, the presentation transport system accesses the presentations collection and opens the presentation by invoking the open function member of the presentations collection while passing the file name of the working copy of the presentation. The open function member returns a reference to the presentation object that represents the presentation. After opening the presentation or, if the presentation was already open, the presentation transport system determines if the user has selected to include the links contained in presentation (step 320). If the user has not indicated to include links, processing continues to step 326.

If the user has indicated to include links, the presentation transport system determines if the presentation contains any links (step 322). In this step the presentation transport system iterates through all objects in all slides of the presentation to determine if any of the objects are links. In order to perform this functionality, the presentation transport system uses the count property of the slides collection to determine the total number of slides contained in the presentation and uses the count data member of the objects collection on each slide to determine the total number of objects grouped within each objects collection. When iterating through each object, the presentation transport system checks the object's type to determine if it is a link. This processing is more clearly described in the following code sample of visual basic pseudocode where "WorkingPres" is a variable containing a pointer to the presentation object representing the working copy of the presentation.

Code Table 1

```
For ii = 1 To WorkingPres.Slides.Count
    For jj = 1 to WorkingPres.Slides(ii).Objects.Count
        If WorkingPres.Slides(ii).Objects(jj).type = LinkedObject
        /* this object is a link object, so copy link sources and reset links*/
        Next jj
Next ii
```

If no links are detected in the presentation, processing continues to step 326. However, if one or more links are detected in the presentation, the link sources are copied and the links are reset (step 324). In this step, each link source is copied to the user's temp directory by accessing the LinkSource data member of the linked object of the original presentation (i.e., before it was copied), which contains a reference to the LinkSource. The LinkSource data member is accessed by using the following statement: OriginalPresentation.Slides(ii).Objects(jj).LinkSource, where "OriginalPresentation" is a variable containing a pointer to the presentation object of the original presentation. The LinkSource data member contains the relative location of the linked data within the link source, the file name of the link source, and its path, which may contain network address information if the link source is remote. The presentation transport system resets the link on the working copy of the presentation to refer to the copy of the link source located in the temp directory by invoking the SetLinkSource function member of the link object (i.e., WorkingPres.Slides(ii).Objects(jj).SetLinkSource) passing the path to the temp directory, the relative location of the linked data, and the file name as a parameter. After setting the link, both an absolute version of the link and a relative version of the link are stored. The absolute version of the link refers to the link source using its full path name, whereas the relative version of the link refers to the location of the link source relative to the directory in which the presentation is located. Since the link source is contained in the same directory as the presentation (i.e., the temp directory), the relative version of the link contains only the file name and the relative location of the linked data. On the destination computer, when the link is used to access the link source, the absolute version of the link is used first, and when it fails, the relative version of the link is used. Since during the unpacking process, the file is kept within the same directory as the presentation, the relative version of the link is ensured to work; thus, this step sets the link so as to ensure that it will be operational on the destination computer.

After copying the link sources and resetting the links, the presentation transport system saves the working copy of the presentation (step 326). In this step, the presentation transport system invokes the save function member of the presentation object (i.e., WorkingPres.Save) and sets the SaveWithFonts data member (i.e., WorkingPres.SaveWithFonts) equal to true if the user would like the presentation transferred with the fonts and sets this data member equal to false if the fonts are not to be transferred. After invoking the save function member with the SaveWithFonts data member set appropriately, the presentation with all of its updated links are saved. After saving the presentation, the presentation transport system creates a playlist file (step 328 of FIG. 3C). The playlist file contains a listing of all the presentations that are currently being packed and this file is saved in the user's temp directory. Next, the setup program is copied to the transfer medium (step 330). As previously stated, the setup program is used on the destination computer to automatically unpack the presentation and ready it for display.

After copying the setup program, the presentation transport system compresses all of the files to be transferred (step 332). In this step, the presentation transport system includes the link sources, the presentation, and the viewer, if the user has indicated to include the viewer. The compression of the files is performed by any of a number of well-known compression techniques, such as run length encoding. Additionally, any of a number of well-known compression products may be used to perform the compression, such as PKZip, which is sold by PKWare, Inc. of Brown Deer, Wis. After compressing the files, all of the compressed files are stored onto the transfer medium (step 334). In this step, the files are copied to the transfer medium regardless of whether the transfer medium is a local storage device or a remote storage device. In the case where the transfer medium is the local floppy disk drive, if the files are too large to fit onto a single floppy disk, the presentation transport system automatically divides the files and stores them across multiple floppy disks. That is, the user inserts a first floppy disk, and the system indicates to the user when to insert a second floppy disk and so forth until all of the files have been stored on a number of floppy disks. The setup program is stored on the first floppy disk so that when the first floppy disk is inserted into the destination computer, the unpacking process can be initiated. After storing all of the files on the transfer medium, the presentation transport system cleans up the temp directory by deleting all of the extraneous files contained therein (step 336).

Figure 5:
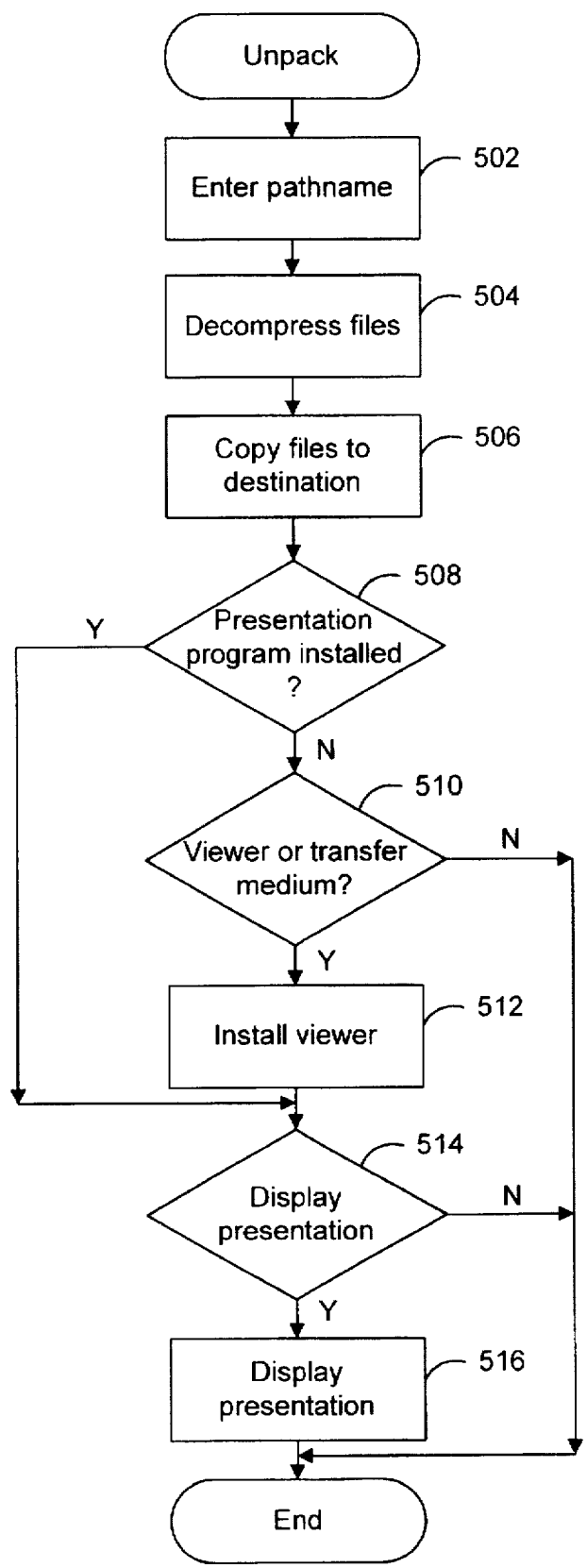
FIG. 5 depicts a flowchart of the steps performed by the presentation transport system of FIG. 1 during the unpacking process.
Figure 6A:
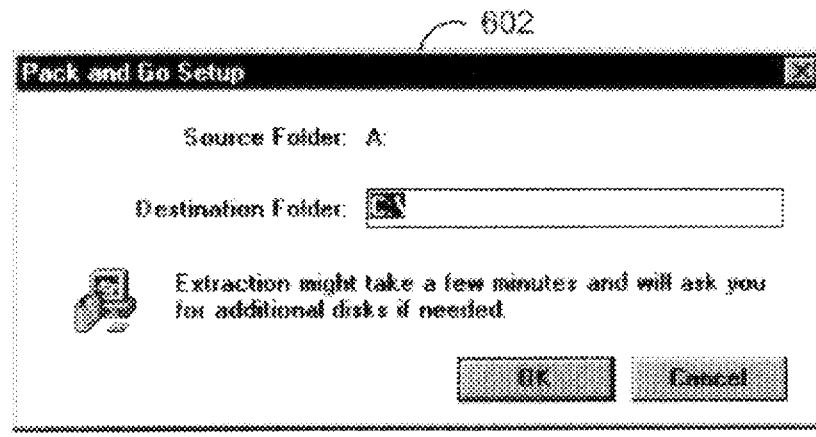
FIGS. 6A and 6B depict the screens displayed to a user by the presentation transport system of FIG. 1 during the unpacking process.

FIG. 5 depicts a flow chart of the steps performed by the presentation transport system during the unpacking process. The unpacking process occurs after the transfer of the presentation and all of the associated files to the destination computer and after launching the setup program. In the case of the transfer medium being floppy disks, the user has manually carried the floppy disks to the destination computer, inserted the first floppy disk, and launched the setup program contained thereon. In the case of a secondary storage device that is either local or remote to the destination computer being the transfer medium, the user accesses the transfer medium, which may occur via the network, and launches the setup program. The first step performed during the unpacking process is to present the user with screen 602, depicted in FIG. 6A, which allows the user to enter a path name for the destination (step 502). The destination is the location where the presentation is to be stored for use on the destination computer. After entering the path name, the presentation transport system accesses the transfer medium and decompresses all of the files that have been transferred (step 504). In the case where the transfer medium is a storage device other than a floppy disk, all of the files are contained within the directory of the setup program and the setup program merely decompresses these files. In the case of a floppy disk, the presentation transport system requests the user to serially input each floppy disk while the system copies and decompresses each file. After decompressing the files, the presentation transport system copies all of the decompressed files to the path specified by the user as the destination (step 506).

Figure 6B:
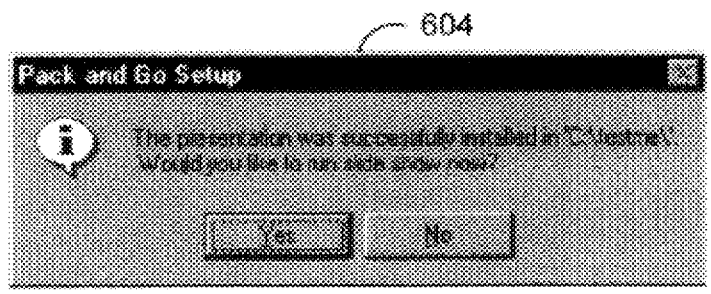

After copying the files, the presentation transport system determines if the presentation program has been installed (step 508). In this step, the presentation transport system accesses the registry of the Windows 95 operating system. The registry is a database that contains various hardware and software configuration information. Information is accessed in the registry by using various well-known registry API functions. These functions provide access to the data, which is classified in accordance with four keys. In this step, the presentation transport system accesses the data stored at HKEY_CLASSES_ROOT by querying the key "HKEY_CLASSES_ROOT\PowerPoint.Show.7\protocol\StdFileEditing\Server." This query returns a path to the presentation program, if it is installed. If the presentation program has been installed, processing continues to step 514. Otherwise, the presentation transport system determines if the viewer is contained on the transfer medium (step 510). The presentation transport system performs this step by looking for the viewer files on the transfer medium. If the viewer is not on the transfer medium, processing ends. However, if the viewer is on the transfer medium, the viewer is installed by adding the file name and the path name of the viewer to the registry key described above (step 512). After performing this step, the viewer is operational. Next, the presentation transport system determines if the user wishes to view the presentation by displaying window 604 as shown in FIG. 6B (step 514). If the user indicates that they would like to view the presentation, the presentation transport system displays the presentation using the presentation program if it is installed, or in the alternative, the viewer (step 516). While displaying the presentation, all of the links in the presentation will be operational so that the user can edit and display the link source.

While the present invention has been described with reference to a preferred embodiment thereof, those skilled in the art will know of various changes in form that may be made without departing from the spirit and scope of the claimed invention as defined in the appended claims.

We claim:

1. A method in a computer system for transferring a slide presentation from a source computer to a destination computer, the slide presentation having a plurality of slides, one or more slides having a link that refers to linked data within an independent link source, the linked data forming a portion of the slide when displayed, the computer system having a slide presentation program that exposes behavior for manipulating the slide presentation to a client, the method comprising:

under control of a pack program executing at the source computer as a client of the slide presentation program,
  requesting the slide presentation program to open the slide presentation;
after the slide presentation is opened,
  for each of the plurality of slides,
    requesting the slide presentation program to identify whether the slide contains a link; and
    when the slide contains a link,
      copying the link source referred to by the link to a transfer medium; and
      requesting the slide presentation program to adjust the link to refer to the copied link source;

copying the slide presentation with the adjusted links to the transfer medium;

under control of an unpack computer program executing at the destination computer, for each link source on the transfer medium, copying the link source from the transfer medium onto a storage medium of the destination computer;

copying the slide presentation from the transfer medium onto the storage medium of the destination computer; and under control of the slide presentation program executing at the destination computer, presenting the slide presentation stored on the storage medium wherein each link of a slide of the slide presentation refers to a link source on the storage medium.

2. The method of claim 1 wherein the requesting the slide presentation program to adjust the link includes adjusting the links so that the link source is referred to relative to a location of the slide presentation on the transfer medium.

3. The method of claim 1 wherein the presenting the slide presentation occurs automatically after copying of the link sources and the slide presentation from the transfer medium to the storage medium.

4. A method in a computer system for transferring a slide presentation from a source computer to a destination computer, the slide presentation having a plurality of slides, the slide presentation using a font, one or more slides having a link that refers to linked data within a link source, the linked data forming a portion of the slide when displayed, the computer system having a slide presentation program that exposes behavior for manipulating the slide presentation to a client, the method comprising:

under control of a pack computer program executing at the source computer as a client of the slide presentation program, requesting the slide presentation program to open the slide presentation;

after the slide presentation is opened, for each of the plurality of slides, requesting the slide presentation program to identify whether the slide contains a link; and when the slide contains a link, copying the link source referred to by the link to a transfer medium; and requesting the slide presentation program to adjust the link to refer to the copied link source;

copying the slide presentation with the adjusted links to the transfer medium; and copying the font to the transfer medium; and under control of an unpack computer program executing at the destination computer, for each link source on the transfer medium, copying the link source from the transfer medium onto a storage medium of the destination computer;

copying the slide presentation from the transfer medium onto the storage medium of the destination computer; and copying the font from the transfer medium to the storage medium of the destination computer so that the slide presentation can be presented at the destination computer in the same font as presented at the source computer; and under control of the slide presentation program executing at the destination computer, presenting the slide presentation stored on the storage medium in the stored font wherein each link of a slide of the slide presentation refers to a link source on the storage medium.

5. A method in a computer system for transferring a slide presentation from a source computer to a destination computer, the slide presentation having a plurality of slides, one or more slides having a link that refers to linked data within a link source, the linked data forming a portion of the slide when displayed, the computer system having a slide presentation program that exposes behavior for manipulating the slide presentation to a client, the method comprising:

under control of a pack computer program executing at the source computer as a client of the slide presentation program, requesting the slide presentation program to open the slide presentation;

after the slide presentation is opened, for each of the plurality of slides, requesting the slide presentation program to identify whether the slide contains a link; and when the slide contains a link, copying the link source referred to by the link to a transfer medium; and requesting the slide presentation program to adjust the link to refer to the copied link source;

copying the slide presentation with the adjusted links to the transfer medium; and copying a presentation viewer to the transfer medium, the presentation viewer for presenting the slide presentation;

under control of an unpack computer program executing at the destination computer, for each link source on the transfer medium, copying the link source from the transfer medium onto a storage medium of the destination computer;

copying the slide presentation from the transfer medium onto the storage medium of the destination computer; and copying the presentation viewer from the transfer medium to the storage medium wherein the slide presentation program executing at the destination computer is the presentation viewer; and under control of the presentation viewer copied to the storage medium and executing at the destination computer, presenting the slide presentation stored on the storage medium wherein each link of a slide of the slide presentation refers to a link source on the storage medium.

6. A method for preparing a file for transfer by a presentation transport system in a data processing system, the method comprising:

receiving an indication from a user to transfer the file, the file containing a link to linked data contained in an independent external source, the link used for accessing the linked data; and in response to receiving the indication and under the control of the presentation transport system, identifying the link contained in the file; and storing the file and the external source onto a transfer medium such that after transferring the file, the linked data is accessible via the link.

7. The method of claim 6 wherein the file is a slide presentation.

8. The method of claim 7 wherein the slide presentation contains a plurality of slides and wherein the method further includes the steps of selecting the slide presentation for transfer by a user and displaying a representation of a first of the slides in the slide presentation to the user in response to selecting the slide presentation.

9. The method of claim 6 wherein the step of storing the file includes compressing the file and the external source.

10. The method of claim 9, further including transferring the file, and the external source to a destination computer and decompressing the file and the external source after transferring the file and the external source to the destination computer.

11. The method of claim 6 wherein the transfer medium is a plurality of removable secondary storage devices and wherein the step of storing the file includes storing the file and the external source across the plurality of removable secondary storage devices.

12. The method of claim 11 wherein the plurality of removable secondary storage devices are a plurality of floppy disks.

13. The method of claim 6 wherein the step of receiving an indication includes receiving an indication from the user to transfer a second file, the second file containing a second link to second linked data contained in a second external source, the second link used for accessing the second linked data, wherein the step of identifying the link includes identifying the second link, and wherein the step of storing the file includes storing the second file and the second external source onto the transfer medium.

14. The method of claim 6 including transferring the file and the external source to a destination computer.

15. The method of claim 14 wherein the step of storing the file includes storing a setup program onto the transfer medium, wherein the step of transferring the file includes transferring the setup program, and wherein the method further includes starting the setup program on the destination computer to ready the file for use.

16. The method of claim 14, further including:
accessing the linked data of the external source via the link at the destination computer; and
displaying the file with the linked data at the destination computer such that the linked data is displayed as an integrated part of the file.

17. The method of claim 6 wherein the data processing system has a presentation program that provides functionality to manage the slide presentation, wherein the presentation transport system performs the identifying step by invoking the functionality of the presentation program.

18. The method of claim 17 wherein the presentation program is an OLE automation server that exposes its functionality to the presentation transport system via an object model containing objects and collections of the objects.

19. A method for preparing a slide presentation for transfer by a presentation transport system in a data processing system, the method comprising:
receiving an indication from a user to transfer the slide presentation, the slide presentation containing a link to linked data contained in an external source, the link used for accessing the linked data; and
in response to receiving the indication and under the control of the presentation transport system,
identifying the link contained in the slide presentation;
storing the slide presentation, the linked data of the external source that is linked by the identified link, and a viewer program for displaying the slide presentation onto a transfer medium; and
transferring the slide presentation, the linked data, and the viewer program to a destination computer such that after transferring the slide presentation, the linked data, and the viewer program, the linked data is accessible via the link at the destination computer.

20. The method of claim 19 wherein the step of transferring the file includes installing the viewer program on the destination computer so as to render the viewer program operational.

21. The method of claim 20 wherein the step of installing the viewer program includes launching the viewer program to display the slide presentation.

22. A method for preparing a slide presentation for transfer by a presentation transport system in a data processing system, the method comprising:
receiving an indication from a user to transfer the slide presentation, the slide presentation containing a link to linked data contained in an external source, the link used for accessing the linked data; and
in response to receiving the indication and under the control of the presentation transport system,
identifying the link contained in the slide presentation; and
storing the slide presentation and the linked data of the external source linked by the identified link external source onto a transfer medium such that after transferring the slide presentation, the linked data is accessible via the link,
wherein the slide presentation displays information to a user in a font, wherein the storing of the file includes storing the font onto the transfer medium, wherein the method includes transferring the file, the linked data of the external source and the font to a destination computer, and wherein the method further includes displaying the information of the slide presentation to a user of the destination computer in the font.

23. A data processing system comprising a transfer medium, a source computer, and a destination computer, the transfer medium for transferring data from the source computer to the destination computer, the source computer having a first component for accessing a presentation containing a link to linked data contained in an independent external source such that the linked data is accessed via the link and having a second component for storing the presentation with the external source onto the transfer medium, the destination computer having a third component for receiving the presentation and the external source and having a fourth component for accessing the linked data via the link.

24. The data processing system of claim 23 wherein the transfer medium is a removable storage device.

25. The data processing system of claim 24 wherein the removable storage device is a floppy disk.

26. The data processing system of claim 24 wherein the removable storage device is a hard disk.

27. The data processing system of claim 23 wherein the transfer medium is a network.

28. The data processing system of claim 23 wherein the transfer medium is an Internet.

29. The data processing system of claim 23 wherein the external source is contained on the source computer.

30. The data processing system of claim 23 wherein the external source is contained on a computer that is separate from the source computer and that is communicatively linked to the source computer.

31. The data processing system of claim 23 wherein the external source is a database.

32. The data processing system of claim 23 wherein the external source is a spreadsheet.

33. The data processing system of claim 23 wherein the external source is a word processing document.

34. The data processing system of claim 23 wherein the external source is a text file.

35. The data processing system of claim 23 wherein the external source is a graphics file containing graphics objects.

36. The data processing system of claim 23 wherein the linked data is a video clip.

37. The data processing system of claim 23 wherein the linked data is a sound clip.

38. A method in a data processing system for transferring a file from a source computer to a destination computer, comprising:

accessing the file containing a link referring to linked data stored in an independent external source such that the linked data appears to a user as an integrated part of the file when the file is displayed to a user, the file contained in a first directory and the external source contained in a second directory, the link referring to the linked data, the external source, and the second directory;

storing the file and the external source onto a transfer medium;

updating the link to refer to the external source and the linked data without reference to the second directory;

copying the file and the external source from the transfer medium to a destination directory on the destination computer; and displaying the file and accessing the linked data via the link such that the linked data of the external source is displayed as an integrated part of the file at the destination computer.

39. A method in a data processing system for transferring a file from a source computer to a destination computer, comprising:

accessing the file containing a link referring to linked data stored in an external source such that the linked data appears to a user as an integrated part of the file when the file is displayed to a user, the file contained in a first directory and the external source contained in a second directory, the link referring to the linked data, the external source, and the second directory;

storing the file the external source and a viewer for displaying the file onto a transfer medium;

updating the link to refer to the external source and the linked data without reference to the second directory;

copying the file, the external source, and the viewer from the transfer medium to a destination directory in the destination computer; and displaying the file by invoking the viewer to display the file and accessing the linked data via the link such that the linked data of the external source is displayed as an integrated Part of the file at the destination computer.

40. A computer-readable medium whose contents transfer a slide presentation stored on a source computer to a destination computer in a data processing system, the slide presentation for displaying information in a font to a user, by performing the steps of:

under the control of the source computer,
accessing the slide presentation to identify links contained therein, the links referring to linked data contained in a file that is separate from the slide presentation;
storing the slide presentation with the file onto a transfer medium, storing a viewer program suitable for displaying the slide presentation onto the transfer medium, and storing the font onto the transfer medium; and under the control of the destination computer,
copying the slide presentation, the file, the viewer and the font from the transfer medium onto the destination computer;
installing the viewer onto the destination computer so as to render the viewer operational;
invoking the viewer to display the slide presentation such that the information displayed by the slide presentation is displayed in the font; and
accessing the linked data via the link such that the linked data is displayed as an integrated part of the slide presentation.

41. A computer-readable medium whose contents transfer a file from a source computer to a destination computer in a data processing system, by performing the steps of:

accessing the file containing a link referring to linked data stored in an independent external source such that the linked data appears to a user as an integrated part of the file when the file is displayed to a user; the file contained in a first directory and the external source contained in a second directory; the link referring to the linked data, the external source, and the second directory;

storing the file and the external source onto a transfer medium;

updating the link to refer to the external source and the linked data without reference to the second directory;

copying the file and the external source from the transfer medium to a destination directory on the destination computer; and displaying the file and accessing the linked data via the link such that the linked data of the external source is displayed as an integrated part of the file at the destination computer.

42. A computer-readable medium whose contents cause a presentation transport system to prepare a file for transfer in a data processing system, by performing the steps of:

receiving an indication from a user to transfer the file, the file containing a link to linked data contained in an independent external source, the link used for accessing the linked data;

in response to receiving the indication and under the control of the presentation transport system,
identifying the link contained in the file; and
storing the file and the external source onto a transfer medium such that after transferring the file, the linked data is accessible via the link.

43. A method for transferring a file from a source computer to a destination computer, the file containing a link to linked data in an independent external source, the method comprising:

identifying the link in the file at the source computer;

determining the external source of the linked data by examining the identified link at the source computer;

transferring the file and the external source from the source computer to the destination computer;

receiving the transferred file and the transferred external source at the destination computer; and storing the received file and the received external source at the destination computer such that the linked data is accessible via the link.

44. A data processing system comprising:

a transfer medium for transferring data from a source computer to a destination computer, the source computer containing a presentation program performing finctionality for managing a presentation having a link to linked data in an independent external source, the presentation program further comprising:

an object model for exposing the finctionality provided by the presentation program; and a presentation transport system further comprising:

a request component for receiving a request from a user to transfer the presentation;

an access component for accessing the presentation and identifying the link by invoking the functionality of the presentation program through the object model;

an identify component for identifying the external source by invoking the functionality of the presentation program through the object model; and a copy component for copying the presentation and the external source to the transfer medium; and the destination computer comprising:

a receive component for receiving the presentation and the external source from the transfer medium; and a display component for displaying the presentation such that the linked data in the external source is accessible via the link.

45. The data processing system of claim 44 wherein the presentation program is an OLE automation server.

46. The data processing system of claim 44 wherein the presentation transport system is a visual basic application.

47. A method for transferring a slide presentation from a source computer to a destination computer by a presentation transport system in a data processing system, the method comprising:

receiving an indication from a user to transfer the slide presentation at the source computer, the slide presentation containing a link to linked data in an external source;

in response to receiving the indication and under the control of the presentation transport system, identifying the external source by examining the link in the slide presentation at the source computer; and transferring the slide presentation, the external source, a viewer, and an unpack program from the source computer to the destination computer, the unpack program for readying the slide presentation for use on the destination computer, the viewer for displaying the slide presentation;

invoking the unpack program by the user at the destination computer; and under the control of the unpack program at the destination computer, installing the viewer so as to render the viewer operational; and automatically invoking the viewer to display the slide presentation such that the linked data of the external source is accessible via the link.

* * * * *